(12) United States Patent
Drye

(10) Patent No.: US 7,999,181 B2
(45) Date of Patent: Aug. 16, 2011

(54) HARNESS RETAINER INDICATOR

(75) Inventor: Jeffrey L. Drye, Glendale Heights, IL (US)

(73) Assignee: International Engine Intellectual Property Company, LLC

( * ) Notice: Subject to any disclaimer, the term of this patent is extended or adjusted under 35 U.S.C. 154(b) by 842 days.

(21) Appl. No.: 11/873,009

(22) Filed: Oct. 16, 2007

(65) Prior Publication Data

US 2009/0097224 A1    Apr. 16, 2009

(51) Int. Cl.
*H02G 3/04* (2006.01)

(52) U.S. Cl. ............ 174/72 A; 174/68.1; 174/68.3; 174/72 R; 361/826; 248/49

(58) Field of Classification Search ........... 174/480, 174/481, 72 A, 152 G, 153 G, 135, 650, 72 R, 174/70 C, 95, 96, 73.1, 112, 136, 68.1, 68.3, 174/101; 16/2.1, 2.2; 248/56, 71, 49, 68.1; 277/178; 361/826; 439/76.1, 76.2; 385/134, 385/135

See application file for complete search history.

(56) References Cited

U.S. PATENT DOCUMENTS

| | | | | |
|---|---|---|---|---|
| 4,815,984 | A * | 3/1989 | Sugiyama et al. | 174/72 A |
| 5,597,980 | A * | 1/1997 | Weber | 174/72 A |
| 5,777,274 | A * | 7/1998 | Kawase | 174/153 G |
| 5,973,265 | A * | 10/1999 | O'Brien et al. | 174/72 A |
| 6,791,032 | B2 * | 9/2004 | Doshita et al. | 174/72 A |
| 7,060,908 | B2 * | 6/2006 | Daito | 174/72 A |
| 7,141,737 | B2 * | 11/2006 | Nakamura et al. | 174/72 A |

* cited by examiner

*Primary Examiner* — Angel R Estrada
(74) *Attorney, Agent, or Firm* — Jack D. Nimz; Jeffrey P. Calfa

(57) ABSTRACT

An overmolded harness configured to be received in a receiving structure of an engine includes a body having at least one surface, and at least one retainer configured for engagement with the receiving structure. The retainer protrudes from at least one surface. At least one indicator is overmolded with the body and marks the location of the retainer.

12 Claims, 1 Drawing Sheet

HARNESS RETAINER INDICATOR

BACKGROUND OF THE INVENTION

The present invention relates generally to a wiring harness for automotive engines. More specifically, the present invention relates to a wiring harness having retainers that are attached to a receiving structure on or associated with an engine.

In automotive electrical systems, particularly in large highway motor trucks, one or more wiring harnesses can be used in the course of wiring up various circuits of the automotive electrical systems. With increasing emissions standards, additional sensors are required to measure engine characteristics, which requires additional wiring to the engine. In the case where multiple wiring harnesses are required, junction blocks can be used as connecting panels to join one or more wiring harnesses together in the course of wiring up various circuits of the automotive electrical systems.

During the assembly of the wiring harness, the wires at one end are provided with terminal lugs. The junction block usually has one or more threaded terminal contact posts, insulated from one another, for the reception of the terminal lugs of the wiring harness. The wiring harness has multiple retainers for engaging receiving structures on the engine, or alternatively, receiving structures in electrical connection with the engine.

A conventional harness is generally a series of connectors and wires having a plastic covering, or convolute, forming a rigid support structure. The connectors and wires are usually assembled and taped together with the round convolute on a jig. A plurality of retainers protrude from the bottom surface of the generally round convolute, which are configured to be received in a receiving structure on the engine. Since the convolute is generally round, the retainers are readily visible from most angles by the user during connection with the receiving structures.

However, a disadvantage of this conventional harness is that, when the harness is taken off the jig, the harness is susceptible to shrinking or expanding. When the harness changes shape off of the jig, the harness may no longer fit the engine during assembly.

Recently, harnesses have been manufactured with a foam overmold technology that is applied to the wires. The harness components are provided with a hardened coating to prevent movement of the components. One advantage of the overmold technology is that it prevents shrinking or expansion of the harness. For this reason, the foam overmold technology makes production of the harness more accurate, consistent and repeatable. In addition, the overmold technology is considered to be more aesthetic.

While the conventional harness had a generally cylindrical cross-section, the shape of the newer foam overmolded harness is generally rectangular. One disadvantage of the newer foam overmolded harness over the conventional harness is that there is lessened visibility of the retainers from most angles of view. A user trying to assemble the harness onto the receiving structures must either blindly feel the bottom surface or rotate the harness 180-degrees to find the location of the retainers. Given the conditions under which a user must assemble an engine, it is not convenient to take these additional steps to locate the retainers.

Thus, there is a need for an overmolded harness that reduces the amount of time and steps involved in assembling an engine.

There is also a need for an overmolded harness that can be manufactured in a cost efficient manner.

BRIEF SUMMARY OF THE INVENTION

The above-listed needs are met or exceeded by the present overmolded harness configured to be received in a receiving structure of an engine. The harness includes a body having at least one surface, and at least one retainer configured for engagement with the receiving structure. The retainer protrudes from at least one surface of the body. At least one indicator is overmolded with the body and marks the location of the retainer.

An alternate embodiment of an overmolded harness that is configured to be received in a receiving structure of an engine is provided. The harness includes a body having a lower surface, an upper surface, a first side surface and a second side surface. The harness also includes at least one retainer that is located in the lower surface and that is configured for engagement with the receiving structure. At least one indicator is overmolded in at least one of the upper, the first side and the second side surfaces, and is generally aligned with the location of the at least one retainer in the lower surface.

Also provided is an overmolded harness configured to be received in a receiving structure of an engine. The harness includes a body having a lower surface, an upper surface, a first side surface and a second side surface. At least one retainer is located in the lower surface and is configured for engagement with the receiving structure. At least one indicator is overmolded in the upper surface and is generally aligned with the location of the at least one retainer in the lower surface. The indicator is raised from the upper surface.

DETAILED DESCRIPTION OF THE INVENTION

Figure 1:
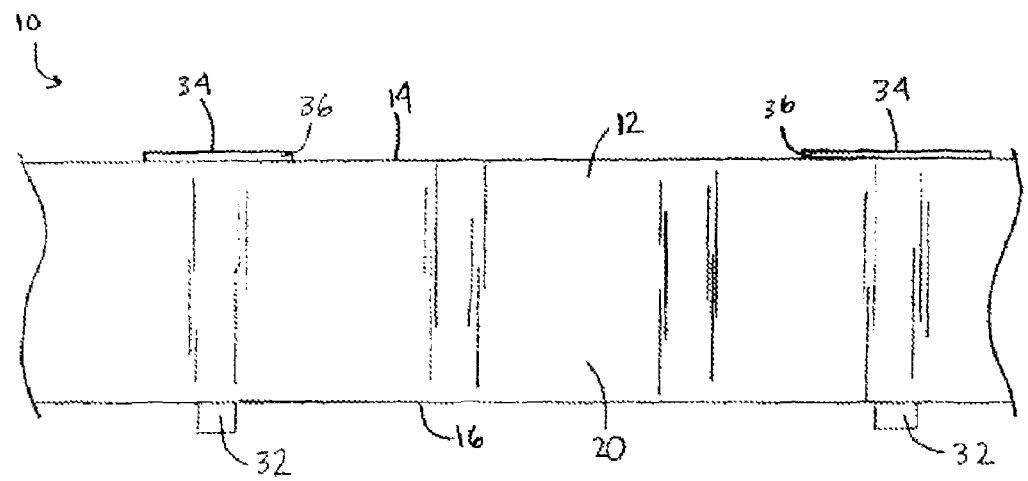
FIG. 1 is a partial side plan view of a the present harness having indicia.
Figure 2:
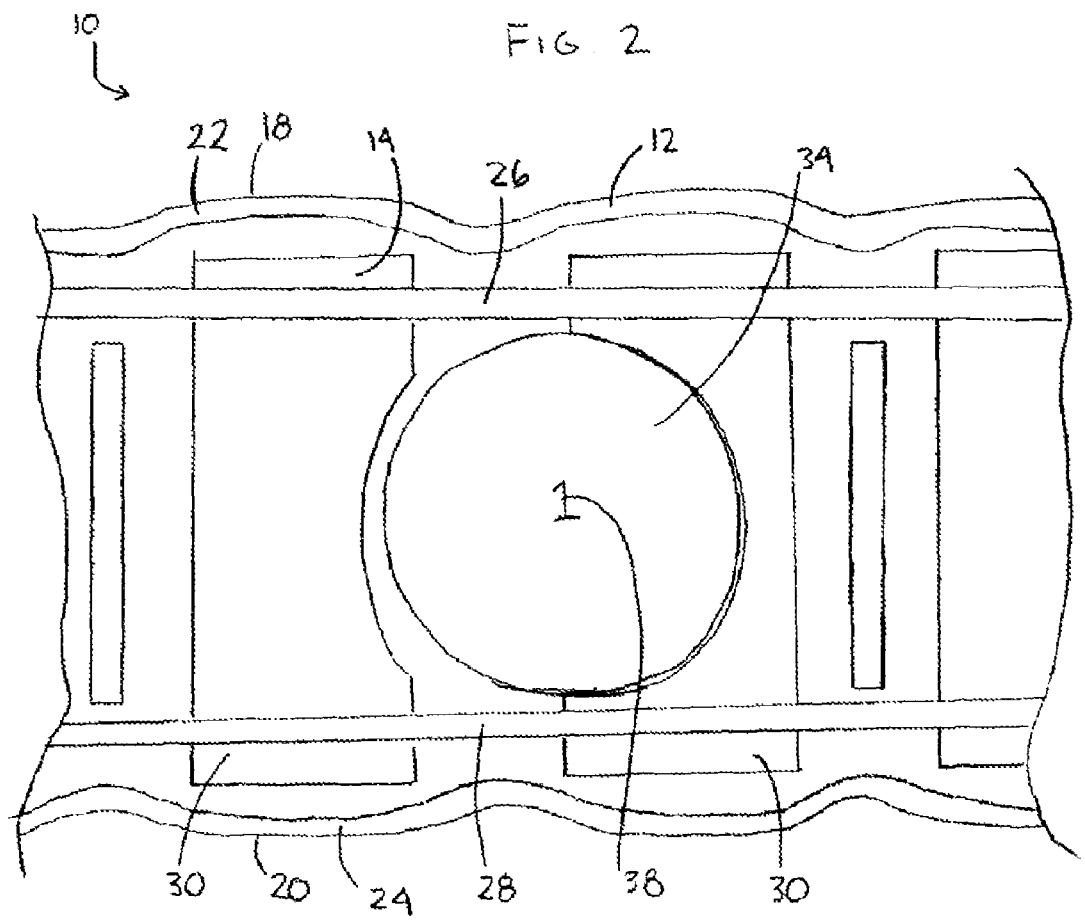
FIG. 2 is a partial top plan view of the harness of FIG. 1.

Referring now to FIGS. 1-2, a harness is depicted generally at 10, and has a generally a rectangular body 12 including a top surface 14, a bottom surface 16 and a first side surface 18 and a second side surface 20. The following description is made with respect to a foam overmolded harness as is known in the art. The improvement to the harness 10 will be described thereafter, however it should be appreciated that the improvement can be applied to different embodiments of harnesses.

As is known in the art, the sides surfaces 18, 20 are defined by a first panel 22 and a second panel 24 that are generally parallel with each other, and which run at least a portion of the length of the harness 10. The first panel 22 and the second panel 24 are formed of foam overmold material. In the preferred embodiment, the first and second panels 22, 24 have a generally corrugated shape, which makes the harness 10 more flexible along its length.

Located within the first and the second panel 22, 24, a first rail 26 and a second rail 28 are generally parallel and preferably spaced a distance from the panels. A plurality of ties 30 are generally perpendicularly disposed with respect to the first and second rails 26, 28. Together, the rails 26, 28 and the ties 30 direct the flow of foam product during the overmolding process. The ties 30 locate the wires (not shown) within the harness 10.

At least one, and preferably a plurality of retainers 32 protrude from the bottom surface 16 along at least a portion of the length of the harness 10. The retainers 32 can be disposed on the harness 10 in regular or irregular intervals. The retainers 32 protrude from the bottom surface 16 by about ¼ to ½ inches, however any length of protrusion is contemplated.

The retainers 32 are configured to be received in a receiving structure on the engine (not shown), or alternatively, receiving structures in electrical connection with the engine. Since the harness body 12 is generally rectangular, and further, since the retainers 32 generally protrude a small amount from the bottom surface 16, the retainers are not visible from most viewing angles. A user trying to assemble the harness 10 onto the receiving structures must either blindly feel the bottom surface 16 or rotate the harness 180-degrees to find the location of the retainers 32.

The improvement in the harness 10 includes at least one indicator 34, and preferably a plurality of indicators formed on the harness. In the preferred embodiment, the indicators 34 are formed in the top surface 14 of the harness 10, and one indicator is provided for each retainer 32. The indicators 34 are generally aligned with the location of the retainer 32 on the bottom surface 16 such that a user can identify the location of the retainer by looking towards the top surface 14.

The indicators 34 are preferably overmolded into the top surface 14. Preferably, the indicator 34 is generally cylindrical and preferably has a slight relief from the top surface 14. In the preferred embodiment, the indicator has a generally cylindrical protrusion wall 36 that protrudes less than ⅛ inch, however any amount of relief (or no relief at all) is contemplated. With the slight relief, the indicator 34 does not interfere with assembly onto the engine, but can be seen at most viewing angles by the user, depending on the geometry of the harness 10. In the preferred embodiment, each indicator 34 is generally cylindrical and preferably has a slight relief from the top surface 14, however, it is contemplated that any other overmolded indicator can be used.

In the preferred embodiment, the indicator 34 has sufficient size and shape to accommodate a thumb of the user. In this configuration, the indicator 34 defines a general thumb-receiving area for the thumb to apply pressure to the harness. Force applied at the thumb-receiving area is transmitted to the retainer 32 located on the bottom surface 16 to engage the retainer into the receiving structure.

While the preferred embodiment has been shown and described, it should be appreciated that the size, shape, location and configuration of the indicator 34 should not be limited to the preferred embodiment. Instead, it is contemplated that other sizes, shapes, locations or configurations of overmolded indicators 34 can be used. Further, a plurality of indicators 34 may be provided for each retainer 32, such as multiple indicators centered around the location of the retainer. Further still, indicators 34 may be associated with only selected retainers 32. It is also contemplated that the indicators 34 can be associated with other components besides retainers 32.

Additionally, it is contemplated that the indicator 34 can extend to additional sides of the body 12, for example, to the first side surface 18, the second side surface 20 and the bottom surface 16. Alternatively, it is contemplated that the indicator 34 can be located on a surface other than the top surface 14, for example on the side surfaces 18, 20. Further still, it is contemplated that the indicator 34 can be located at any surface on the body 12 that is visible. The indicator 34 may also be provided with a marking 38, such as color, wording, numbering, symbols or other marking to increase visibility and delineate which retainer 32 and/or other component the indicator is marking the location of.

It is also contemplated that the indicator 34 can be applied to a harness 10 that has a non-rectangular shape. For example, if an overmolded harness has a circular shape, it is contemplated that an annular ring-shaped indicator could be used, among other indicator shapes.

In contrast to the conventional harness where indicators can be added after formation of the harness, such as by adding tape, the present indicator 34 is formed during the overmolding process. By tooling the overmolding machinery (as is known in the art) to include the indicator 34, the indicator is automatically formed when the harness body 12 is overmolded, eliminating the step of manually adding tape (or other types of indicators). There is minimal cost impact in including the overmolding of the indicator 34 with the harness 10.

While particular embodiments of the present harness 10 have been shown and described, it will be appreciated by those skilled in the art that changes and modifications may be made thereto without departing from the invention in its broader aspects and as set forth in the following claims.

I claim:

1. An overmolded harness configured to be received in a receiving structure of an engine, said harness comprising:
    a generally rectangular body having at least one surface;
    at least one retainer configured for engagement with the receiving structure and protruding from said at least one surface;
    at least one indicator overmolded with said body and marking the location of said retainer;
    wherein said at least one retainer protrudes from a bottom surface and said at least one indicator protrudes from a top surface.

2. The harness of claim 1, wherein said at least one retainer comprises a plurality of retainers disposed along said body.

3. The harness of claim 1 wherein said at least one indicator comprises a plurality of indicators disposed along said body that are generally aligned with said plurality of retainers.

4. The harness of claim 1 wherein said indicator is raised with respect to said at least one surface.

5. The harness of claim 1 wherein said indicator is generally round.

6. An overmolded harness configured to be received in a receiving structure of an engine, said harness comprising:
    a body having a lower surface, an upper surface, a first side surface and a second side surface;
    at least one retainer located in said lower surface and configured for engagement with the receiving structure;
    at least one indicator overmolded in at least one of said upper, first side and second side surfaces, raised with respect to said body, and generally aligned with the location of said at least one retainer in said lower surface.

7. The harness of claim 6 wherein said at least one indicator is generally round.

8. The harness of claim 6 wherein said at least one retainer comprises a plurality of retainers disposed along said body.

9. The harness of claim 6 wherein said at least one indicator comprises a plurality of indicators disposed along said body and generally aligned with said plurality of retainers.

10. The harness of claim 9 wherein said at least one indicator is disposed on a plurality of surfaces.

11. The harness of claim 6 wherein said indicator is provided with a marking.

12. An overmolded harness configured to be received in a receiving structure of an engine, said harness comprising:
    a body having a lower surface, an upper surface, a first side surface and a second side surface;
    at least one retainer located in said lower surface and configured for engagement with the receiving structure;
    at least one indicator overmolded in said upper surface and generally aligned with the location of said at least one retainer in said lower surface, wherein said indicator is raised from said upper surface.

* * * * *